(12) United States Patent
Alves

(10) Patent No.: US 10,850,355 B2
(45) Date of Patent: Dec. 1, 2020

(54) SEVERING DEVICE

(71) Applicant: Ford Global Technologies, LLC, Dearborn, MI (US)

(72) Inventor: Bruno Alves, Huerth (DE)

(73) Assignee: Ford Global Technologies, LLC, Dearborn, MI (US)

( * ) Notice: Subject to any disclaimer, the term of this patent is extended or adjusted under 35 U.S.C. 154(b) by 322 days.

(21) Appl. No.: 15/881,928

(22) Filed: Jan. 29, 2018

(65) Prior Publication Data

US 2018/0214988 A1     Aug. 2, 2018

(30) Foreign Application Priority Data

Jan. 27, 2017   (DE) .................. 10 2017 201 324

(51) Int. Cl.

| | | |
|---|---|---|
| *B23K 28/02* | (2014.01) | |
| *B23D 57/00* | (2006.01) | |
| *B23K 26/34* | (2014.01) | |
| *B23K 26/346* | (2014.01) | |
| *B33Y 30/00* | (2015.01) | |
| *B33Y 40/00* | (2020.01) | |
| *B23K 26/342* | (2014.01) | |
| *B23K 26/00* | (2014.01) | |
| *B23K 26/08* | (2014.01) | |
| *B23K 26/16* | (2006.01) | |
| *B23K 37/047* | (2006.01) | |
| *B33Y 50/02* | (2015.01) | |
| *B23K 37/02* | (2006.01) | |

(52) U.S. Cl.
CPC .......... *B23K 28/02* (2013.01); *B23D 57/0007* (2013.01); *B23K 26/0093* (2013.01); *B23K 26/0853* (2013.01); *B23K 26/16* (2013.01); *B23K 26/34* (2013.01); *B23K 26/342* (2015.10); *B23K 26/346* (2015.10); *B23K 37/047* (2013.01); *B33Y 30/00* (2014.12); *B33Y 40/00* (2014.12); *B23K 37/0247* (2013.01); *B33Y 50/02* (2014.12)

(58) Field of Classification Search
CPC .... B23K 26/342; B23K 26/346; B23K 26/34; B23K 28/02; B23K 26/0093; B23K 26/0085; B23K 26/16; B23K 50/02; B23K 37/0247; Y02P 10/295; B22F 3/1055; B33Y 30/00; B33Y 40/00; B33Y 50/02; B23D 57/0007

See application file for complete search history.

(56) References Cited

U.S. PATENT DOCUMENTS

| | | | |
|---|---|---|---|
| 8,738,166 B2* | 5/2014 | Abe ................... | B22F 3/1055 |
| | | | 700/120 |
| 10,315,247 B2* | 6/2019 | Mark .................. | B33Y 30/00 |
| 2017/0014905 A1* | 1/2017 | Kawada ............... | B33Y 30/00 |

FOREIGN PATENT DOCUMENTS

| | | |
|---|---|---|
| CN | 104259892 | 1/2015 |
| CN | 204340227 | 5/2015 |
| DE | 102015001480 | 8/2016 |

(Continued)

*Primary Examiner* — Jennifer C Chiang
(74) *Attorney, Agent, or Firm* — Burris Law, PLLC

(57) ABSTRACT

A severing device for mechanically severing metal-containing 3D objects from a base plate of a 3D printing apparatus is provided. The severing device has at least one first machining unit firmly connectable to the 3D printing apparatus with at least one machining tool which has a working zone which encompasses at least part of an area of the base plate.

20 Claims, 3 Drawing Sheets

(56) References Cited

FOREIGN PATENT DOCUMENTS

| JP | 2009255246 | 11/2009 |
|----|------------|---------|
| WO | 2016/064170 | 4/2016 |

* cited by examiner

SEVERING DEVICE

CROSS-REFERENCE TO RELATED APPLICATIONS

This application claims priority to and the benefit of DE 102017201324.9 filed on Jan. 27, 2017. The disclosure of the above application is incorporated herein by reference.

FIELD

The present disclosure relates to a severing device for mechanically severing metal-containing 3D objects from a base plate of a 3D printing apparatus.

BACKGROUND

The statements in this section merely provide background information related to the present disclosure and may not constitute prior art.

3D printing of objects made from metallic materials is known from the prior art as the additive manufacturing (AM) process. Processes conventionally used in such 3D printing are for example selective laser melting (SLM) and selective laser sintering (SLS). In both processes, the metallic material in powder form is applied by means of a roller or a doctor blade from a reservoir in a thin, two-dimensional layer on a base plate of a 3D printer and locally melted with a laser beam at predetermined points, wherein the material then rapidly solidifies. The base plate is then conventionally lowered by the amount of the layer thickness and another layer of powder applied to the base plate. These operations are repeated until the desired workpiece is complete. After completion of the workpiece, the un-remelted powder can generally be returned to the reservoir.

During the melting operation, in particular for the first applied material layers, a mechanical connection is created between the base plate and the workpiece, such that, once completed, the workpiece must be severed from the base plate. Severing may be performed using conventional metal saws or processes such as wire erosion. At transition points between the base plate and the workpiece, it is therefore conventional to provide supporting structures which are removed during post-machining of the workpiece in order to obtain the desired shape of the workpiece.

In particular in the case of large and therefore heavy workpieces, robust base plates are required in order to avoid any unwanted deformation during production as a result of the weight of the workpiece. Severing the workpiece from the base plate may therefore prove difficult and requires specific manufacturing steps and a certain amount of machining time during which the base plate is unavailable for manufacturing further 3D objects.

Once the workpiece has been severed from the base plate, it is moreover necessary to remove any residual structures of the manufactured workpiece from the base plate so that the latter is in its original form ready for further manufacture.

Suitable processes for machining base plates are known from the prior art. WO 2016/064170 A1, for example, describes a mobile horizontal cutting machine for machining the upper surface of a base plate of a press or forging machine, in particular a mobile horizontal cutting machine which cuts the irregular upper surface of a base plate to a predetermined thickness in order to keep the upper surface of the base plate horizontal. The cutting machine may here be accurately adjusted not only in the horizontal direction but also in the vertical direction in order to adjust the cutting depth. The mobile horizontal cutting machine has an installed plain bearing in order to reduce the coefficient of friction of a sliding connecting part, whereby improved durability is achieved.

JP 2009255246 A describes a cutting/peeling device for a coated metal plate which is suitable for suitably peeling a layer of a coated metal plate, and a cutting tool.

The cutting/peeling device for a coated metal plate has a transfer table device with a clamping mechanism for fastening a projecting end of the coated metal plate and first and second cutting tool drive devices. The first and second cutting tool drive devices each have a rotary shaft, each of which shafts is rotated by separate motors as drive sources. Cutting tools, which are mounted on the rotary shafts, peel a portion of the plated layers from both the front and rear faces of the end of the coated metal plate by a turning operation. A peeled portion is formed by cutting and peeling a portion of a plated layer of the end of the coated metal plate by a reciprocating motion of the end of the coated metal plate by the transfer table device while the end of the plated metal plate is arranged in a machining position between the two cutting tools of the first and second cutting tool drive devices.

CN 204340227 U describes a cleaning device for a base plate of a 3D printer. The cleaning device comprises a main cutting bar, a part-receiving device, cutting bars, connecting rods, fastening caps and rotary knobs, wherein threaded connecting pieces are attached to the main cutting bar and a handle is attached to an upper part of the main cutting bar. Each cutting bar is provided with threaded connecting pieces. A plurality of holes are provided in each connecting rod. Thanks to the connecting pieces, the main cutting bar and the plurality of cutting bars are in a fitting connection with the holes in the connecting rods. The main cutting bar is located in the midst of the plurality of cutting bars. A threaded hole is formed in each rotary knob and the rotary knobs are attached to threaded connecting pieces. The fastening caps are mounted on threaded connecting pieces. The part-receiving device is attached to the main cutting bar by thin steel pins which fit in holes. The distance between the cutting bars is adjustable, such that the cleaning device can be adapted to base plates of different kinds. The cleaning device is provided with the part-receiving device so that a product can be conveniently taken out. The structure is simple, the error rate low, the extent of damage to a base plate of the 3D printer can be reduced and the damage rate for 3D printed products can be reduced.

CN 104259892 A describes a severing process for parts which are produced by selective laser melting (SLM) and in particular describes a design scheme for a stationary mount for a base plate. The method is mainly directed towards severing the parts from the base plate in the plane direction of the base plate and is specifically suitable for sawing or may be applied to linear cutting. The complete mount set comprises a base member, a clamping plate and a fixed screw. In comparison with a conventional fastening device, a fixed direction is added, such that the entire mount set is specifically suited to the condition that relatively thin plates are cut in the plane direction. The stability of the entire mount set is ensured by the integrated structure of the fixed plate and the base member. A cutting selection region of differing thickness base plates is enlarged by the presence of a first clamping plate guide rail. The issue of oblique positioning of the base plates when temporarily unfixed is solved by forming short projections on the first clamping plate. If machining performance is ensured, cutting accuracy and safety can be ensured.

In the light of the indicated prior art, there is still room for improvement in the area of severing metal-containing 3D objects from a base plate of a 3D printing apparatus.

SUMMARY

The present disclosure provides a severing device for severing metal-containing 3D objects from a base plate of a 3D printing apparatus, wherein it is intended for the base plate to be available again for further manufacture of metal-containing 3D objects within the shortest possible time.

It should be noted that the features and measures listed individually in the following description may be combined in any desired, technically expedient manner and disclose further configurations of the present disclosure. The description additionally characterizes and gives details of the present disclosure in particular in connection with the figures.

The severing device according to the present disclosure for mechanically severing metal-containing 3D objects from a base plate of a 3D printing apparatus comprises at least one first machining unit firmly connectable to the 3D printing apparatus. The first machining unit contains at least one machining tool which has a working zone which encompasses at least part of an area of the base plate.

The terms "first", "second", etc. used in the present application merely serve for differentiation. In particular, using these terms is not intended to imply any sequence or priority of the objects used in connection therewith.

For the purposes of the present disclosure, the expression "firmly connectable" should in particular be taken to mean that the machining unit and the 3D printing apparatus are detachably firmly or nondetachably firmly connectable together and in particular also that the machining unit and the 3D printing apparatus are also firmly connectable together during the production of a 3D object. For the purposes of the present disclosure, the expression "detachably firmly connectable" should be taken to mean that a fitter can reversibly make and break such a mechanical connection.

The severing device according to the present disclosure makes it possible to cut down on the set-up times for obtaining and setting up a machining tool. One suitable form furthermore makes it possible to mechanically sever metal-containing 3D objects from a base plate of a 3D printing apparatus in a predetermined manner independently of a fitter. The standardization of mechanical severing which is made possible means that increased product quality, for example by compliance with stricter tolerance limits at transition points between the 3D object and base plate, can be achieved.

In advantageous forms of the severing device, the first machining unit has at least one linear actuator for adjusting a position of the at least one machining tool. As a result, a working zone of the machining tool may advantageously be enlarged, such that it is also possible to enable severing of 3D objects which occupy a large part of the area of the base plate after production.

The at least one machining tool of the first machining unit particularly advantageously takes the form of a milling tool or a saw.

In advantageous forms, the severing device has a second machining unit firmly connectable to the 3D printing apparatus for cleaning at least part of the surface of the base plate. The first machining unit contains at least one machining tool which has a working zone which encompasses at least part of the surface of the base plate.

The at least one machining tool of the first machining unit and/or the at least one machining tool of the second machining unit are electrically, pneumatically or hydraulically drivable.

In advantageous forms of the severing device, the second machining unit has at least one linear actuator for adjusting a position of the at least one machining tool. As a result, a working zone of the machining tool may advantageously be enlarged, such that it is also possible to enable cleaning of the surface of the base plate after severing of produced 3D objects which require a large part of the area of the base plate.

The position of the at least one machining tool of the second machining unit may for example be continuously adjusted by the linear actuator. It has, however, likewise been considered to enable stepwise adjustment of the position, wherein a size of the steps may be adapted to a dimension of the machining tool in the adjustment direction.

A further aspect of the present disclosure proposes a 3D printing apparatus for producing metal-containing 3D objects, wherein the 3D printing apparatus has a base plate for supporting the 3D objects at least during production and a severing device according to the present disclosure.

The advantages described in connection with the severing device are applicable in their entirety to the 3D printing apparatus.

In one form, the 3D printing apparatus comprises a cleaning unit for cleaning at least part of the surface of the base plate, wherein the cleaning unit is equipped with at least one suction device which is provided for aspirating metal-containing powder and/or machining residues from the mechanical severing. The at least one suction device has a working zone which encompasses at least part of the surface of the base plate. As a result, the surface of the base plate can straightforwardly be cleared of excess metal-containing powder and be prepared for a new production operation. The metal-containing powder can be aspirated once the metal-containing 3D object has been severed from the base plate and/or once the surface of the base plate has been cleaned by the machining tool of the second machining unit.

For the purposes of the present disclosure, the expression "provided for the purpose" should in particular be taken to mean specifically programed, designed or arranged therefor.

If the cleaning unit has at least one filter element for separating out the aspirated metal-containing powder and/or the machining residues, the aspirated metal-containing powder may be particularly straightforwardly put to further use and the machining residues may be particularly straightforwardly screened out and removed from the manufacturing process.

In particularly, one form of the 3D printing apparatus contains a control unit which is at least provided for the purpose of driving the first machining unit of the severing device, mechanically severing a 3D object from the base plate and/or driving the second machining unit of the severing device, in order to clear at least part of the surface of the base plate.

As a result, it is possible to mechanically sever metal-containing 3D objects from a base plate of a 3D printing apparatus and to clean part of the surface of the base plate in a predetermined manner independently of a fitter.

The control unit is advantageously furthermore provided for the purpose of driving the cleaning unit for cleaning at least part of the surface of the base plate. As a result, at least part of the surface of the base plate can be cleaned without response times subsequent to clearance of part of the surface by the second machining unit, such that the base plate can be provided more rapidly for further manufacture of metal-containing 3D objects.

In another form, the control unit particularly has a processor unit and a digital data storage unit to which the processor unit has data access, wherein the processor unit is provided for driving the first and second machining units and the cleaning unit and the first and second machining units and the cleaning unit are provided to be driven by the processor unit.

With regard to providing the base plate as promptly as possible, the control unit is provided for the purpose of semi-automatically or fully automatically at least driving the first machining unit for mechanically severing at least one 3D object from the base plate or at least driving the second machining unit for clearing at least part of the surface of the base plate or at least driving the cleaning unit for cleaning at least part of the surface of the base plate.

For the purposes of the present disclosure, "semi-automatically" should in particular be taken to mean driving by means of the control unit being carried out after initiation by a user, for example by triggering an electrical signal. For the purposes of the present disclosure, "fully automatically" should in particular be taken to mean driving by means of the control unit being initiated by the 3D printing apparatus. For example, initiation of driving may be triggered by completion of a production program of the 3D printing apparatus.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
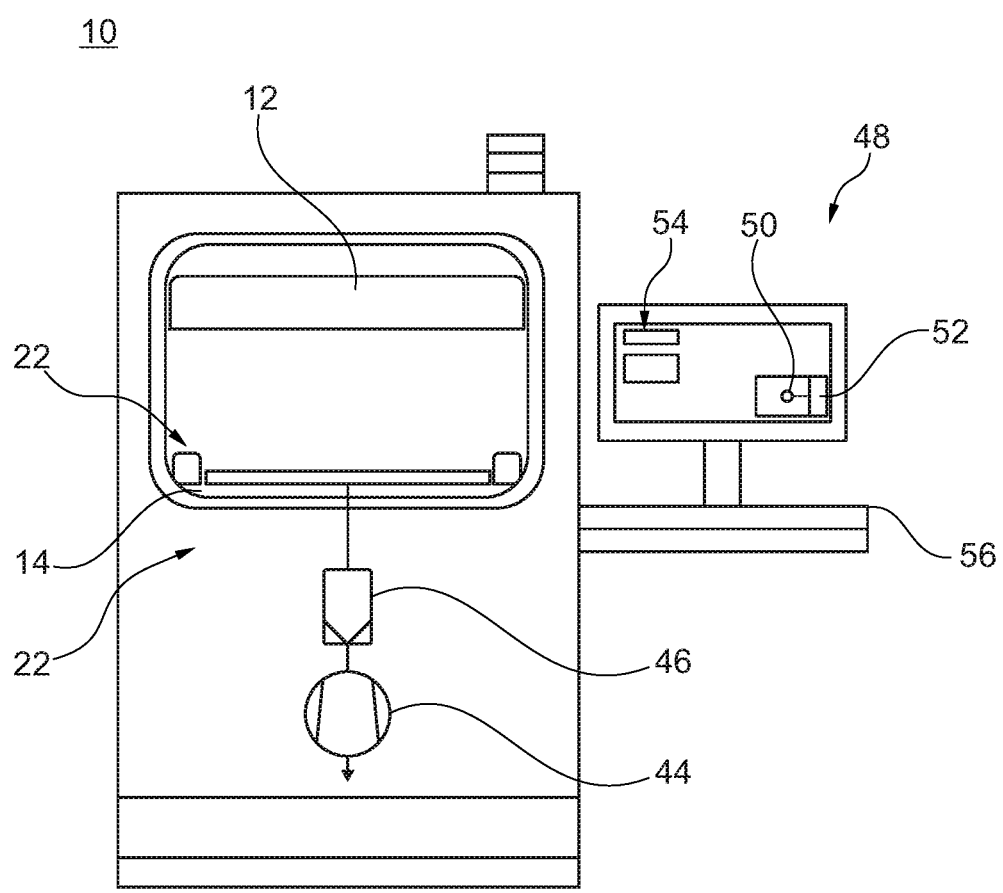
FIG. 1 shows a schematic front view of a 3D printing apparatus having a severing device according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a 3D printing apparatus 10 for producing metal-containing 3D objects with one possible form of a severing device 22 according to the present disclosure in a schematic front view. This specific form of the 3D printing apparatus 10 uses a per se known selective laser melting (SLM) installation with a plurality of laser beam systems 12 each with a power of a number of 100 W.

The 3D printing apparatus 10 comprises a rectangular base plate 14 for supporting the 3D objects during production. In a manner known per se, a metallic material in powder form, for example an aluminum-magnesium alloy, may be applied by means of a doctor blade from a reservoir (not shown) in a thin, two-dimensional layer on the base plate 14 of the 3D printing apparatus 10 and locally melted with one or more of the laser beam systems 12 at predetermined points. Once the metallic material has solidified, the base plate 14 can then be lowered by means of a lowering device (not shown) by the amount of the layer thickness and another layer of powder applied to the base plate 14. This is repeated until the desired 3D object is complete.

Figure 2:
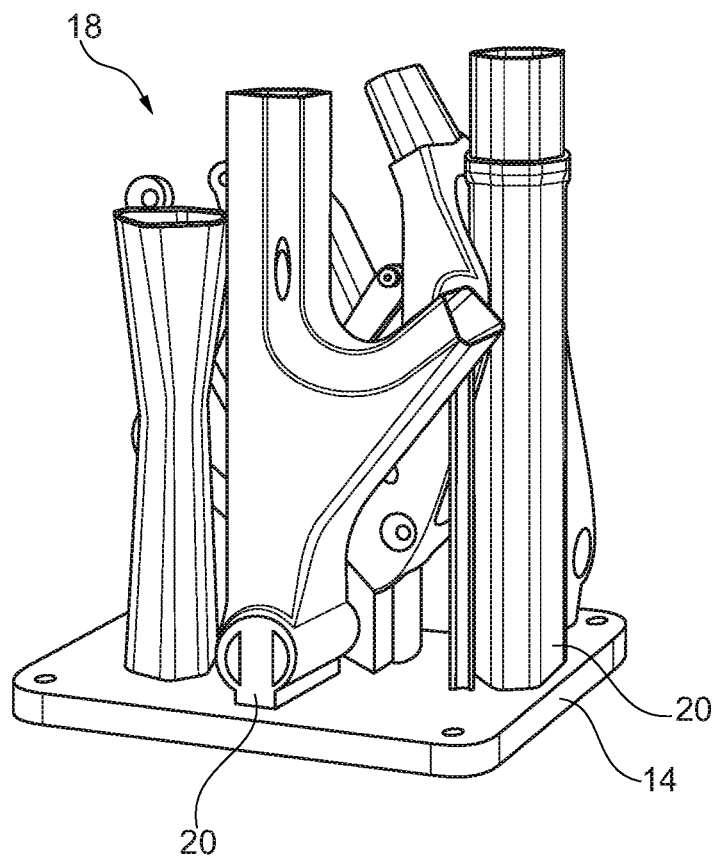
FIG. 2 shows a metal-containing object produced on a base plate using a 3D printing apparatus in accordance with the present disclosure.

As shown in FIG. 2, the completed 3D object 18 and the base plate 14 form a mechanical assembly. Supporting structures 20 may be provided at transition points between the base plate 14 and the 3D object 18, which supporting structures have to be removed during post-machining of the 3D object 18 in order to obtain the desired workpiece shape.

Figure 3:
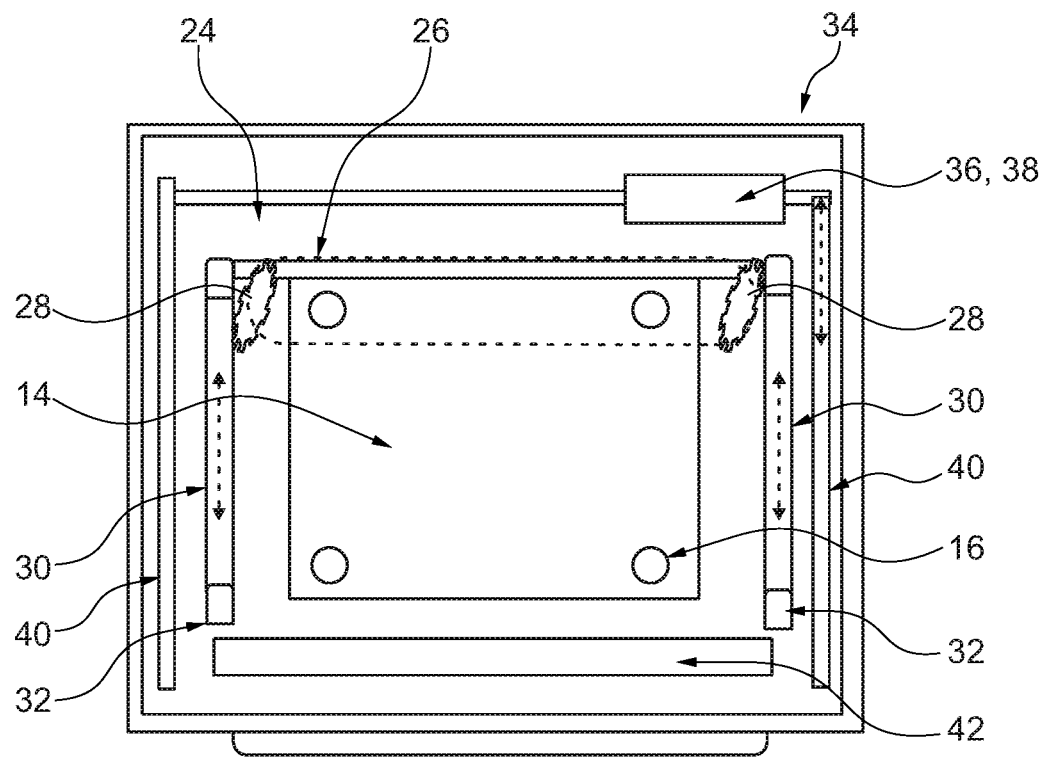
FIG. 3 shows a schematic plan view of the severing device according to FIG. 1 in a state installed in the 3D printing apparatus.

FIG. 3 shows a schematic plan view of the severing device 22 according to the present disclosure according to FIG. 1 in a state installed in the 3D printing apparatus 10. The severing device 22 serves for mechanically severing the metal-containing 3D object 18 from the base plate 14 of the 3D printing apparatus 10.

The base plate 14 is arranged in the XY plane and fastened with four screws 16 to the lowering device arranged thereunder. Without limiting the general nature of the description, the longer sides of the rectangular base plate 14 are oriented parallel to the Y direction.

The severing device 22 comprises a first machining unit 24 firmly connected to the 3D printing apparatus 10. The first machining unit 24 has a machining tool 26 in the form of a diamond wire saw. A continuous wire of the diamond wire saw is guided over two deflection rollers 28, one of which is drivable by means of an electrical drive (not shown).

The first machining unit 24 furthermore comprises two linear actuators 30 acting in the X direction which are arranged on the 3D printing apparatus 10, outside the base plate 14, parallel to the shorter edges thereof and projecting therebeyond. One of the two deflection rollers 28 is in each case mounted on one of the actuators 30. The linear actuators 30 acting in the X direction serve to adjust a position of the circulating continuous wire in the X direction. As a result, the first machining unit 24 has a working zone which completely encompasses an area of the base plate 14.

The first machining unit 24 furthermore has four linear actuators 32 acting in the Z direction which are arranged at corner points of a notional rectangle which is larger than the base plate 14 and the sides of which are oriented parallel to the sides of the base plate 14. Each of the linear actuators 30 acting in the X direction is mounted between two linear actuators 32 acting in the Z direction and spaced apart in the X direction. As a result, a position of the circulating continuous wire can be adjusted in the Z direction in a specified working zone.

In this manner, the severing device 22 is provided for the purpose of cutting through all the supporting structures 20 present after completion of the 3D object 18 at a predetermined height above a surface of the base plate 14 in order to mechanically sever the metal-containing 3D object 18 from the base plate 14 of the 3D printing apparatus 10.

Once the 3D object 18 has been mechanically severed from the base plate 14, residues of the supporting structures 20 are still connected to the base plate 14.

The severing device 22 has a second machining unit 34 firmly connected to the 3D printing apparatus 10, which second machining unit serves for clearing the surface of the base plate 14 and in particular for removing the residues of the supporting structures 20 from the base plate 14.

The second machining unit 34 contains a machining tool 36 in the form of a grinding disc which is drivable by an electrical drive (not shown). The second machining unit 34 is provided for clearing the surface of the base plate 14 by peripheral surface grinding.

The second machining unit 34 has an actuator 38 acting in the Y direction in which the grinding disc is mounted and the electrical drive of which is arranged.

The second machining unit 34 furthermore has two linear actuators 40 acting in the X direction between which is mounted the actuator 38 acting in the Y direction. As a result, a position of the grinding disc both in the X direction and the Y direction can be adjusted within specified actuating ranges. The specified actuating ranges are selected such that the second machining unit 34 has a working zone which completely encompasses the area of the base plate 14.

The 3D printing apparatus 10 moreover contains a cleaning unit 42 for cleaning the surface of the base plate 14. The cleaning unit 42 is equipped with a suction device formed by a plurality of suction openings arranged spaced apart in the Y direction. The suction openings are connected for flow to a suction pump 44 of the cleaning unit 42 (FIG. 1) which is arranged below the base plate 14 in the 3D printing apparatus 10. The suction device are provided for aspirating the excess metal-containing powder and machining residues from the mechanical severing, for example residues of the supporting structures 20. The suction device have a working zone which encompasses part of the surface of the base plate 14.

Arranged between the suction openings and the suction pump 44, the cleaning unit 42 additionally has a filter element 46 for separating out the aspirated metal-containing powder and aspirated machining residues.

The 3D printing apparatus 10 is equipped with a control unit 48 for controlling the various components. The control unit 48 contains a processor unit 50 and a digital data storage unit 52, to which the processor unit 50 has data access, and a display unit 54 and a user interface 56 in the form of a keyboard. The first machining unit 24, the second machining unit 34 and the suction pump 44 of the cleaning unit 42 are connected by control cables (not shown) to the control unit 48 and provided for driving by the control unit 48. The control unit 48 is provided for the purpose of driving the first machining unit 24 by means of the processor unit 50 in order to mechanically sever the produced 3D object 18 from the base plate 14. The control unit 48 is furthermore provided for the purpose of driving the second machining unit 34 in order to clear the entire surface of the base plate 14. The control unit 48 is furthermore provided for the purpose of driving the suction pump 44 of the cleaning unit 42 in order to clean excess, metal-containing powder from the surface of the base plate 14.

The control unit 48 is furthermore provided for the purpose, once the 3D object 18 has been produced, of sending requests on the display unit 54 to an operator of the 3D printing apparatus 10 with regard to carrying out the described processing steps.

The first machining unit 24, the second machining unit 34 and the suction pump 44 are each driven semi-automatically by the control unit 48 after confirmation of the corresponding requests by the operator of the 3D printing apparatus 10 by means of a predetermined input via the keyboard. In this manner, the base plate can be provided for the production of further 3D objects after just a few minutes.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A severing device for mechanically severing metal-containing 3D objects from a base plate of a 3D printing apparatus, the severing device comprising:
    at least one first machining unit connected to the 3D printing apparatus, the at least one first machining unit including at least one machining tool in the form of a continuous wire and having a working zone encompassing at least part of an area of the base plate.

2. The severing device as claimed in claim 1 further comprising two deflection rollers, wherein the continuous wire is guided over the two deflection rollers and the first machining unit further comprises at least one linear actuator for adjusting a position of at least one of the two deflection rollers such that the working zone of the first machining unit completely encompasses the area of the base plate.

3. The severing device as claimed in claim 1 further comprising a second machining unit connected to the 3D printing apparatus for clearing at least part of a surface of the base plate, wherein the second machining unit includes at least one machining tool having a working zone encompassing at least part of the surface of the base plate.

4. The severing device as claimed in claim 3, wherein the second machining unit has at least one linear actuator for adjusting a position of the at least one machining tool.

5. A 3D printing apparatus for producing metal-containing 3D objects, the 3D printing apparatus comprising a base plate for supporting the 3D objects at least during production and the severing device as claimed in claim 1.

6. The 3D printing apparatus as claimed in claim 5 further comprising:
    a cleaning unit for cleaning at least part of a surface of the base plate,
    wherein the cleaning unit is equipped with at least one suction device for aspirating metal-containing powder and/or machining residues from mechanical severing, and the cleaning unit having a working zone encompassing at least part of the surface of the base plate.

7. The 3D printing apparatus as claimed in claim 6, wherein the cleaning unit includes at least one filter element for separating the aspirated metal-containing powder and the machining residues.

8. The 3D printing apparatus as claimed in claim 5 further comprising a control unit configured to at least one of drive the first machining unit of the severing device, mechanically sever a 3D object from the base plate, and drive a second machining unit of the severing device, in order to clear at least part of a surface of the base plate.

9. The 3D printing apparatus as claimed in claim 8, wherein the control unit is configured to drive a cleaning unit for cleaning at least part of the surface of the base plate.

10. The 3D printing apparatus as claimed in claim 8, wherein the control unit is configured to semi-automatically or fully automatically drive at least one of the first machining unit for mechanically severing the 3D object from the base plate, the second machining unit for clearing at least part of the surface of the base plate, and a cleaning unit for cleaning at least part of the surface of the base plate.

11. A 3D printing apparatus for producing 3D objects comprising:
   a base plate for supporting the 3D objects; and
   a severing device for mechanically severing the 3D objects from the base plate, the severing device comprising:
      a first machining unit comprising a machining tool in the form of a continuous wire guided over two deflection rollers and at least two linear actuators acting in a X direction, each of the at least two linear actuators acting in the X direction mounted between two linear actuators acting in a Z direction, wherein the two deflection rollers are mounted to the at least two linear actuators acting in the X direction such that the first machining unit has a working zone completely encompassing an area of the base plate; and
      a second machining unit comprising at least one actuator acting in a X direction, each actuator mounted to an actuator acting in a Y direction.

12. The 3D printing apparatus as claimed in claim 11, wherein one of the at least two linear actuators acting in the X direction acts in a plane of the base plate and another of the at least two linear actuators acting in the X direction acts outside of the plane of the base plate.

13. The 3D printing apparatus as claimed in claim 11, wherein the machining tool of the first machining unit is electrically, pneumatically, or hydraulically drivable.

14. The 3D printing apparatus as claimed in claim 11 further comprising a cleaning unit for cleaning a surface of the base plate.

15. The 3D printing apparatus as claimed in claim 14 further comprising a control unit configured to drive the cleaning unit.

16. The 3D printing apparatus as claimed in claim 14, wherein the cleaning unit includes a plurality of suction openings arranged in the Y direction, each suction opening is connected to a suction pump arranged below the base plate.

17. The 3D printing apparatus as claimed in claim 16 further comprising at least one filter element arranged between the suction openings and the suction pump.

18. The 3D printing apparatus as claimed in claim 11 further comprising a control unit.

19. The 3D printing apparatus as claimed in claim 18, wherein the control unit is configured to drive at least one of the first machining unit to mechanically sever the produced 3D object from the base plate, and the second machining unit to clear a surface of the base plate.

20. The 3D printing apparatus as claimed in claim 19, wherein the control unit semi-automatically or fully automatically drives at least one of the first machining unit and the second machining unit.

* * * * *